United States Patent [19]

Hedvall et al.

[11] 4,082,656
[45] Apr. 4, 1978

[54] FILTER DISC FOR MAGNETIC SEPARATOR

[75] Inventors: Per Hedvall; Per Strandberg, both of Vesteras, Sweden

[73] Assignee: ASEA Aktiebolag, Vesteras, Sweden

[21] Appl. No.: 637,408

[22] Filed: Dec. 3, 1975

[30] Foreign Application Priority Data

Jan. 9, 1975 Sweden .............................. 75001941

[51] Int. Cl.² .............................................. B03C 1/02
[52] U.S. Cl. ..................................... 209/222; 210/222
[58] Field of Search ............... 209/219, 223 R, 223 A, 209/222, 232, 214, 215, , 218, 220, 478, 39; 210/222, 223; 335/295; 198/690

[56] References Cited

U.S. PATENT DOCUMENTS

| 2,162,190 | 6/1939 | Woodford | 209/223 R |
| 2,645,745 | 7/1953 | Moleton | 209/223 R X |
| 2,700,744 | 1/1955 | Simmons | 335/295 |
| 3,168,464 | 2/1965 | Fernis | 209/223 R |
| 3,503,504 | 3/1970 | Bannister | 209/223 R |
| 3,506,439 | 4/1970 | Messer | 335/303 |
| 3,959,145 | 5/1976 | Lundquist | 210/223 |

FOREIGN PATENT DOCUMENTS

| 191,810 | 10/1956 | Austria | 210/222 |
| 1,042,809 | 11/1958 | Germany | 210/222 |
| 1,198,114 | 7/1970 | United Kingdom | 209/222 |

Primary Examiner—Robert Halper
Attorney, Agent, or Firm—Watson, Cole, Grindle & Watson

[57] ABSTRACT

A filter disc for a magnetic separator is formed of two wall discs having a layer of permanent magnets arranged between them and in contact with each other. The permanent magnets have holes therethrough and have cut-away corners. The magnets are adhered to the wall discs by glue which enters the openings between and within the permanent magnets.

4 Claims, 5 Drawing Figures

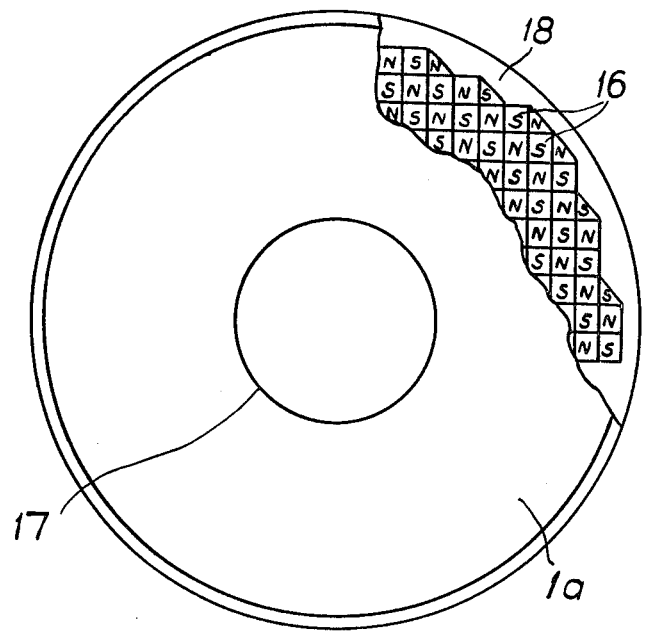
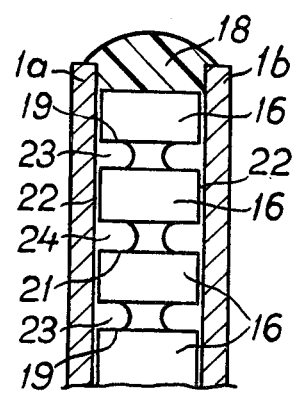
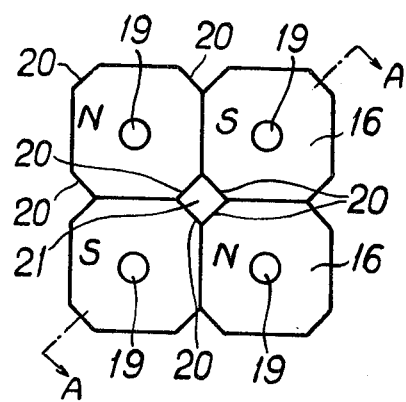

FILTER DISC FOR MAGNETIC SEPARATOR

BACKGROUND OF THE INVENTION

1. Field of the Invention

The invention relates to a filter disc for magnetic separators.

2. The Prior Art

It is well-known that liquids contaminated with suspended particles or dissolved high-molecular substances, for example resinous substances, can be cleaned by adding a ferromagnetic particulate material, for example magnetite, iron, cobalt or nickel, to the liquid and separating the contamination together with the ferromagnetic material in a magnetic field. It is also known to clean in a similar way liquids which, from the start, contain contaminations of ferromagnetic particulate material, for example coolant leaving machine tools, such as lathes and drills. Contaminated gases can also be cleaned in principle by the addition of a ferromagnetic particulate material and treatment in a magnetic field for separation of the contaminations. It is also known to use chemical flocking agents simultaneously in the cleaning process, for example lime, alum, iron chloride, polyelectrolytes and water glass.

In the above described cleaning operations a magnetic separator is used. One such separator (shown for example in Lundquist application Ser. No. 440,872, filed Feb. 8, 1974), now U.S. Pat. No. 3,959,145 is built up of a number of substantially parallel filter discs which are attached, radially directed and spaced from each other, along a rotatable shaft. The filter discs contain permanent magnets producing magnetic field gradients in the spaces located between the filter discs. The medium which is to be filtered and which, when entering the separator, contains a ferromagnetic particulate material, is caused to pass the spaces, which causes the contaminations to adhere to the walls of the filter discs. In a known embodiment of such a filter disc, the permanent magnets are arranged in close contact with each other between two wall discs which act as limit walls for the filter disc in the lateral direction. The permanent magnets can be fixed to the wall disc by a glue, for example an epoxy resin glue.

The use of filter discs of the kind described with glued magnets has proved to involve certain problems. One problem is that the bond between the magnets and the wall discs is not in all respects satisfactory. This is particularly true when using ceramic magnets when the bond between the magnet and the glue may be insufficient to withstand the shear forces which occur when the separator is in operation. The shear forces may be caused by bending forces on the filter discs because of turbulence in the water or another medium which is to be subjected to cleaning, or by the effect of a scraper by which the material adhering to the discs is removed. Another problem with these filter discs is connected with their manufacture. When pressing wall discs with intermediate magnets against each other in connection with the curing of the glue, it has proved to be difficult to retain the magnets in their intended positions. During pressing part of the glue flows from the space between the wall discs outwards towards the periphery, and it has then been found to be difficult to prevent the magnets from following the glue to a certain extent.

SUMMARY OF THE INVENTION

According to the present invention it has proved to be possible to eliminate said problems.

The present invention relates to a filter disc for a magnetic separator comprising two wall discs and permanent magnets arranged therebetween and making contact with one another, said permanent magnets being fixed to the wall discs by a glue, characterised in that in at least some permanent magnets or between at least some permanent magnets making contact with one another there are arranged holes facing the wall discs, into which holes the glue projects.

Holes in this connection do not refer only to holes having cylindrical or other shapes, for example parallelepipedal or conical shape, but also to any cavity or recess in or between the magnets at their surfaces facing the wall discs, for example a grooved depression, a removed edge or a removed corner of a magnet or of several adjacent magnets where the edge or the corner, respectively, would otherwise constitute part of the contact surface.

It may be advantageous to make the holes pass through the permanent magnets. When filling up the through holes with glue, transverse plugs of glue between the wall discs are formed, which may contribute to increase the resistance of the filter disc to stresses. Through holes are also an advantage from an economical point of view, since in that case more magnetic material is saved than if the holes are not made to pass through.

It is of course an advantage to provide the holes in those parts of the surfaces of the magnets where the field gradients are smallest. If the magnets have parallelepipedal shapes, it is thus advantageous to apply the holes substantially in the middle of the surfaces of individual magnets, facing the wall discs, or where the corners of four adjacent magnets are in contact with one another. If the holes are arranged in such places they will contribute to increase the magnetic field gradients of an individual magnet, and of an aggregate of four magnets, respectively.

BRIEF DESCRIPTION OF THE DRAWINGS

The invention will be explained in more detail by way of examples with reference to the accompanying drawings, in which FIG. 1 schematically shows a magnetic separator perpendicular to the direction of flow of the medium (the relevant scraper means not being shown) containing filter discs according to the present invention, FIG. 2 the same separator in the direction of flow of the medium, FIG. 3 a filter disc for the separator according to FIGS. 1 and 2, one wall disc being partly removed, FIG. 4 a crosssection (section A—A in FIG. 5) of a part of a filter disc according to FIG. 3 and FIG. 5 magnets in the filter disc according to FIG. 3 on a larger scale.

DESCRIPTION OF THE PREFERRED EMBODIMENTS

Figure 1:
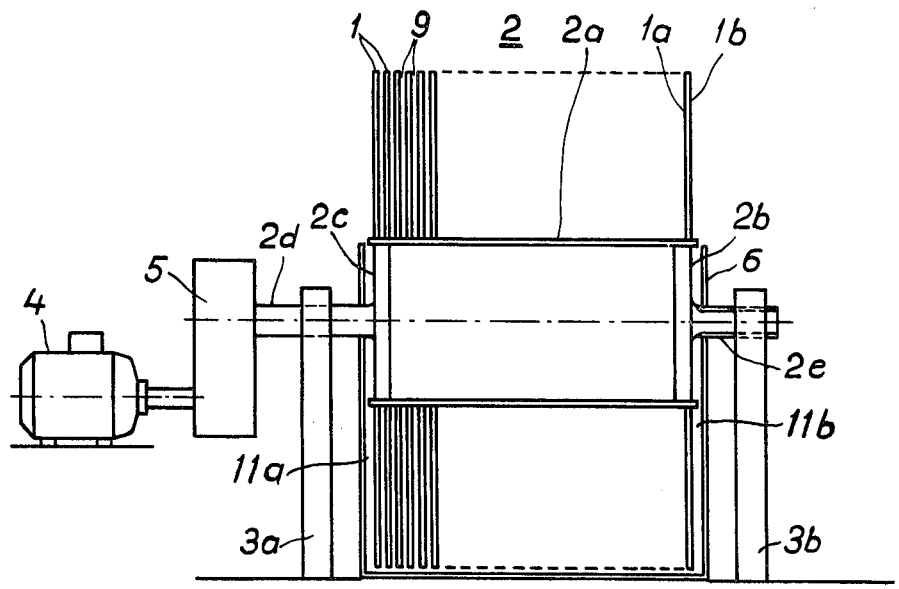
Figure 2:
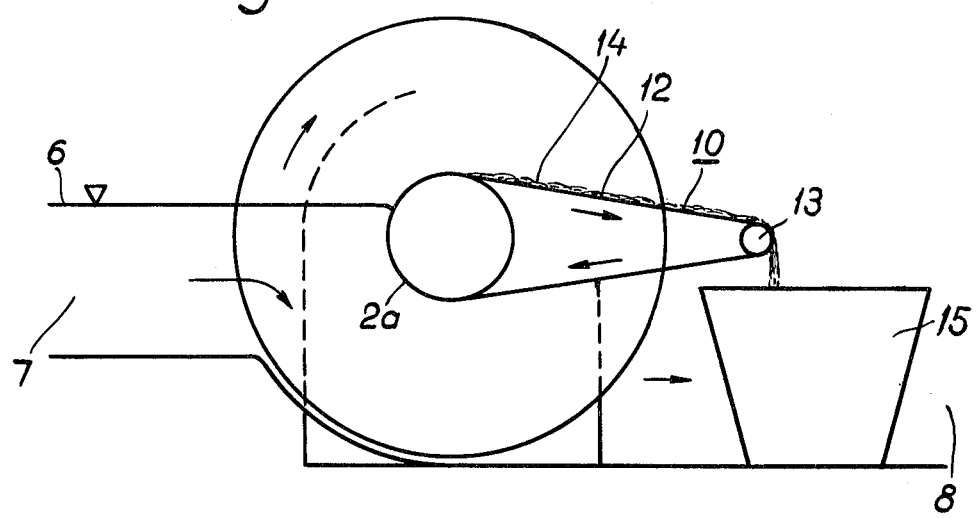

The magnetic separator according to FIGS. 1 and 2 consists of a plurality of filter discs 1, each one consisting of two parallel walls 1a and 1b between which permanent magnets are arranged, as will be explained further with reference to the description of FIGS. 3 to 5. The filter discs are arranged parallel to each other along the shaft 2 of the separator and are located in planes perpendicular to the shaft. The separator shaft comprises in the exemplified case a central, wider part 2a, flanges 2b and 2c and shaft ends 2d and 2e which are journalled in supports 3a and 3b. The shaft is driven by a motor 4 through a gear 5. The unit consisting of the filter discs mounted on the shaft 2 is arranged in a tank 6 for the medium to be cleaned, usually contaminated water. The tank inlet is designated 7 and its outlet 8. When flowing through the separator, the medium is conveyed through the gaps 9 between the discs 1. In that process, ferromagnetic particles, with the substances which are to be separated attached to them, adhere to the walls of the separator and accompany the walls during rotation of the discs, which preferably is performed against the direction of flow of the medium. The separator is provided with a scraper means 10 consisting of endless conveyor belts arranged in each gap 9 between the discs and in the gaps 11a and 11b outside the outermost walls. Each conveyor belt consists in the exemplified case of a belt 12 of rubber or stainless steel which surrounds the central part 2a of the separator shaft and a roll 13 located outside the discs. The belt 12 can be driven either by the separator shaft or by the roll 13 or by both. When the discs rotate, the adherent material is scraped off when passing the belt 12. The belt does not have to run tightly against the discs, but there can be a small play to reduce the wear. The material 14 scraped off by the belt is transported by the belt to a collecting container 15. It is possible to have a simple scraper means arranged at the roll 13 to prevent scraped-off material from being returned to the separator.

As is clear from FIGS. 3 to 5, each filter disc 1 consists of two walls 1a and 1b, for example of stainless steel and having a thickness of 0.5 mm. Magnets 16 of barium ferrite are closely packed between the walls from the shaft hole 17 to the periphery. Instead of barium ferrite magnets there can be used other magnets, preferably ceramic magnets such as of strontium ferrite. In principle, however, it is also possible to use metallic magnets, such as samarium cobalt magnets. The magnets are fixed to the walls by a glue, as will be described further in the following. The magnets may, for example, have a length in the magnetising direction of 5–10 mm and an area of 1–5 cm$^2$ perpendicular to the magnetising direction. Two adjacent magnets within the same disc have different polarities in the example shown. In this way a maximum field gradient is formed. The gap between the magnets 16 and the outwardly-facing edges of the separator is filled with a rubber material 18, suitably of a cold-setting type, for example a cold-setting silicon rubber (such as Gurisil from Gurit AG, Switzerland) which is hardened on the spot.

The magnets 16 are provided with holes, which is not shown in FIG. 3 in order not to make this figure difficult to understand, but which is illustrated in FIGS. 4 and 5.

Each magnet has a centrally located through hole 19 (FIG. 5) and bevelled edges 20 perpendicular to the surfaces facing the wall discs, so that through holes 21 are also formed where four individual magnets make contact with each other.

The magnets 16 are fixed to the wall discs 1a and 1b by a glue, preferably of a cold-setting and solvent-free type, for example an epoxy resin glue (such as Araldit AW 106,100 parts by weight, with hardener HW 953 U, 80 parts by weight, from CIBA AG, Switzerland). The glue need not consist of a resinous binder, but may also, among other things, be of inorganic type. Glue joints between the magnets and the wall discs are designated 22 (FIG. 4). The glue also enters the holes 19 and 21 and partly fills up these holes; some holes may be completely filled up. The glue is designated 23 in the holes 19 and 24 in the holes 21. By the presence of the holes and by anchoring hardened glue therein, the advantages described before are obtained. During the manufacture of the filter disc the magnets 16 are applied close to each other between the wall discs 1a and 1b which have been covered in advance with a layer of glue. In this way it is possible to avoid the use of so much glue that a large number of the holes become entirely filled, which would involve a risk of undesirable yielding of the glue and magnets. The discs are then held pressed against each other until the glue has hardened.

We claim:

1. Filter disc for magnetic separator comprising two wall discs and a layer of parallelepipedal permanent magnets arranged between them, each permanent magnet having sides facing the wall discs and adjacent permanent magnets abutting each other along parallel sides, said permanent magnets being fixed to the wall discs by a layer of glue, said permanent magnets having bevelled edges perpendicular to the surfaces facing the wall discs to form holes at the corners of adjacent magnets, said holes containing glue projecting into them from the layer of glue.

2. Filter disc according to claim 1, in which the holes pass through the permanent magnets.

3. Filter disc according to claim 1, in which the holes are filled with glue.

4. Filter disc according to claim 1, in which the permanent magnets consist essentially of ceramic magnets.

* * * * *